United States Patent Office 3,208,524
Patented Sept. 28, 1965

3,208,524
PROCESS FOR CONTROLLING LOST
CIRCULATION
Victor V. Horner and Richard E. Walker, Tulsa, Okla.,
assignors, by mesne assignments, to Esso Production
Research Company, Houston, Tex., a corporation of
Delaware
No Drawing. Filed Sept. 26, 1960, Ser. No. 58,171
10 Claims. (Cl. 166—32)

The present invention relates to methods for controlling the loss of fluids used in the drilling, completion and workover of oil wells, gas wells and similar boreholes and more particularly relates to an improved process for plugging porous strata surrounding such boreholes in order to prevent the escape of drilling muds and other fluids employed therein. In still greater particularity, the invention relates to a process wherein a polysaccharide gel is prepared at the surface and pumped into such a borehole as a means for plugging lost circulation zones and other highly porous strata.

Drilling muds used in the oil and gas industry often contain materials intended to seal or plug pores in subsurface formations and prevent loss of the mud to the surrounding strata. Such plugging materials are effective in many drilling operations but do not prevent mud losses in all cases. Certain subsurface formations contain natural channels or fissures into which the entire mud readily flows. Other formations are easily fractured by pressure in the borehole and may develop fissures of sufficient size to permit escape of the entire drilling fluid. Formations containing such fissures, whether of natural origin or induced by excessive pressure, are referred to as lost circulation zones because the escape of the mud into the formation generally prevents the maintenance of normal mud circulation in the borehole. The interruption of normal circulation prevents the removal of cuttings from the borehole, leads to a reduction of pressure in the borehole which may be followed by the entry of high pressure fluids from other strata, may result in overheating of the drill bit, and may eventually cause the drill pipe to become stuck in the borehole. Even if some mud is returned to the surface, that lost to the formation must be replaced and hence the cost of continued drilling may become prohibitive. These and other difficulties make it desirable and in some cases imperative that lost circulation zones be plugged as rapidly as possible if drilling is to be continued.

The method normally used to plug lost circulation zones involves the addition of a fibrous, flaky or granular material to the drilling mud and the pumping of the resultant mixture into the borehole until a bridge or mat forms over the openings or fissures through which the mud is escaping. Plugging agents which have been used for this purpose include hay, excelsior, wood shavings, rice, rubber pulp, cotton, cotton seed hulls, rock wool, granular plastics, mica, feathers, sponges, leather and a variety of other materials. The use of such materials frequently results in the plugging of lost circulation zones but the success of this method is by no means certain. Despite the pumping of large volumes of mud containing such solids into the hole, a bridge or mat may never form. Moreover, the introduction of mud containing solids in large quantities may lead to pressure surges which cause fracturing and result in additional fissures through which the mud can escape.

An alternate and frequently more effective method for plugging lost circulation zones is to pump cement into the borehole and permit it to harden. Fibrous, flaky or granular materials may be incorporated into the cement in order to prevent its escape into the lost circulation zone before it sets. Several batches of cement are usually required. Since each batch must be allowed to harden and must be tested before the next one is placed, several days may be consumed in plugging the zone. The additional time required to drill through the cement after circulation has been regained necessitates a further delay. The cost of plugging a lost circulation zone in this manner is generally high. Expenditures in excess of $100,000 for plugging lost circulation zones in a single well are not unusual.

The present invention provides a new and improved method for plugging highly porous strata encountered during the drilling, completion and workover of oil wells, gas wells and similar boreholes. In accordance with the invention, it has now been found that fissures in the strata surrounding a borehole through which fluids tend to escape from the hole can readily be plugged by pumping into the borehole viscous gels prepared from aqueous polysaccharide solutions and suitable cross linking agents. Experience has shown that gels of this type are effective plugging agents and often permit the restoration of normal mud circulation where methods and materials employed in the past are unsuccessful. Their use minimizes the time required for effective plugging because they do not have to set and later be drilled out of the hole. Difficulties due to sticking of the drill string, frequently encountered with conventional plugging agents, are avoided. The low concentrations in which the polysaccharides and cross linking agents are employed make the gels inexpensive and facilitate their use in areas where transportation and handling problems preclude the use of bulky plugging agents. They can be utilized in volumes which would be prohibitively expensive in the case of materials employed heretofore. These and other advantages make the process of the invention attractive from both an engineering and an economics standpoint.

The polysaccharides from which the gels employed in the process of the invention are prepared are glycans containing monosaccharide units having adjacent cis hydroxyl groups attached to the sugar ring structure. Such groups, unlike hydroxyl groups adjacent to one another in the trans position, are highly susceptible to oxidation and undergo extensive complex forming and cross-linking reactions with a variety of polyvalent cation cross-linking agents. These reactions permit the ready formation of polysaccharide gels of the type utilized in accordance with the invention. Monosaccharide units having adjacent cis-hydroxyl groups include D-mannose, D-mannuronic acid and D-mannopyranose. Glycans containing such units may be homoglycans or heteroglycans. Typical homoglycans include 1,4'-D-mannose linear polysaccharides such as ivory nut mannan, wood mannan and salep mannan; 1,4'-D-mannuronic acid linear polysaccharides such as alginic acid; 1,2',1,3'- and 1,6'-D-mannose branched chain polysaccharides such as yeast mannan; 1,4'-D-mannose branched chain polysaccharides such as the mannan of *Porphyra umbilicalis*; and other D-mannose polysaccharides such as mannocarolose. Heteroglycans containing adjacent cis-hydroxyl groups include 1,4'- and 1,6'-D-galactose and D-mannose polysaccharides such as guaran and locust bean gum; glucomannans such as those obtained from Amorphophallus and *Aloe vera*; galactomannans such as those obtained from the endosperms of the honey locust, flame tree, Kentucky coffee bean, paloverde, tara, lucerne, huizache and *Sophora japonica*; D-arabinose and D-mannose polysaccharides; D-glucose, D-mannose and D-galactose polysaccharides; and D-galactose, D-mannose and N-acetyl-D-glucosamine polysaccharides. It will be understood that all of the above-named materials are not equally effective for purposes of the invention and that certain materials will be preferred over others.

Preferred polysaccharides for use in the process of the invention include the galactomannans derived from vegetable sources. Upon hydrolysis these materials yield the two simple sugars, mannose and galactose. Analyses have indicated them to be long chain polymers of D-mannopyranose units linked at the β-1,4-positions and having D-galactopyranose units located as chains on the molecule. The D-galactopyranose units are connected to the $C_6$ atoms of the D-mannose units which make up the main structural framework. The ratio of D-galactose to D-mannose in the galactomannans varies from about 1:1.2 to about 1:2, depending upon the particular vegetable source from which it is obtained. In all cases, however, the mannose residues have cis hydroxyl groups at the $C_2$ and $C_3$ positions, accounting for the gelling properties of the galactomannans and making them useful for purposes of the present invention.

Galactomannans are major constituents of the seeds of a variety of plants. Plants from which they may be extracted include tara, *Caesalpinia spinosa*; huizache, *Caesalpinia cacalaco*; locust bean, *Ceratonia siliqua*; palo-verde, *Cercidium torreyanum*; the flame tree, *Delonix regia*; guar, *Cyamopsis tetriagonolobus*; the honey locust, *Gleditsia triacanthos*; the Kentucky coffee bean, *Gymnocladus dioica*; the prairie mimosa, *Desmanthus illinoensis*; senna, *Cassia leptocarpa*; rattlebox, *Crotalaria intermedia*; clover, *Trifolium pratense*; and soy bean hulls, *Glycine soja*. In recent years guar seeds cultivated in the southwestern section of the United States have provided much of the galactomannan marketed commercially. Because the guar seed product is available from a number of commercial sources at relatively low cost, galactomannan derived from this source is particularly preferred for purposes of the invention.

To obtain the galactomannan from guar or other seeds containing it, the seeds are normally first processed to separate the endosperm from the hull. This is usually done by milling the seed and then washing it after the hull has been loosened. Flame treatment and water-soaking are also used. Separation of the loosened hull is then accomplished by multi-stage grinding and sifting. Differential grinding is employed to separate the germ from the endosperm. The endosperm is then ground to a fine particle size to obtain a dry powder or flour. The flour thus prepared generally contains 75 or more weight percent galactomannan, together with minor amounts of ash, protein, fat, fibre and moisture. It may be utilized in preparing the gels useful for purposes of the invention without further processing. Galactomannan further purified by other techniques may also be used.

Certain of the polysaccharides made up of monosaccharide units containing adjacent cis-hydroxyl groups, 1,4'-mannuronic acid polysaccharides such as alginic acid for example, are not readily soluble in water and therefore generally employed in the form of their water-soluble salts. Sodium alginate is marketed commercially in the form of the crude material derived from algae and as a refined product for use in the food, pharmaceutical and textile industries. Ammonium alginate and other water-soluble salts are also available from commercial sources and may be utilized. In lieu of using a water soluble salt, alginic acid and caustic or other base can be added to water to form the water soluble polysaccharide salt.

Polysaccharides made up of monosaccharide units having adjacent cis hydroxyl groups form viscous, colloidal solutions when hydrated in water. The viscosities obtained depends upon the hydration time, the temperature of the solution, the concentration of polysaccharide in the solution, the pH, the ionic strength of the solution, and the type of agitation employed. High viscosities are generally preferred in solutions to be used for gel formation. Solution viscosity increases until complete hydration has occurred at the end of about 24 hours. A hydration period of about 30 minutes to about 2 hours is preferable. The rate of hydration increases with increasing temperature. Galactomannan and similar polysaccharides utilized in accordance with the invention are compatible with sodium chloride and similar salts over a wide range of concentrations and hence naturally-occurring brines can be used in place of ordinary water for preparing the colloidal solution employed in the process of the invention.

Suitable aqueous polysaccharide solutions can normally be prepared by simply sifting the dry polysaccharide into an agitated tank of water or brine. Agitation should be continued until the solution becomes viscous. Thereafter, the solution may be permitted to hydrate and thicken for a period of from about one-half to about two hours or may be applied before complete hydration of the material. In preparing the colloidal solution in the field, it is usually preferred to slowly mix the polysaccharide with water by feeding it through a conventional mud-mixing hopper. A small amount of sodium hydroxide may be added to the water to increase the pH and stabilize the mixture. About 0.05 pound of caustic per barrel of water is usually satisfactory. Other basic materials in correspondingly larger or smaller amounts may also be used. After about 24 hours, colloidal solutions of certain polysaccharides begin to lose their viscosity because of fermentation and enzymatic hydrolysis. If the polysaccharide solution is not to be used within a 24-hour period, a bacteriostatic or bacteriocidal preservative may be added to the solution to prevent degradation. A variety of organic preservatives may be employed for this purpose. Suitable materials include formaldehyde, chlorinated phenolic compounds, phenylmercuric acetate, benzoic acid and sorbic acid. The amount of preservative used depends upon the particular agent employed.

In preparing the aqueous colloidal solutions, the polysaccharides are normally used in concentrations of about 0.5 to about 12.0 pounds per barrel of water, depending upon the particular polysaccharide employed. Under field conditions, guar gum concentrations between about 1.0 and about 2.0 pounds per barrel of water have been found to be particularly effective for purposes of the invention. Sodium alginate concentrations of from about 8 to about 10 pounds per barrel are most suitable. Other polysaccharides may be used at intermediate concentrations. Forty-two gallon barrels are normally employed in the petroleum industry and hence the concentrations are expressed in terms of barrels of this size.

Aqueous solutions of galactomannan and other polysaccharides containing adjacent cis hydroxyl groups can be gelled by means of a variety of polyvalent cross-linking agents. Materials which may be used include calcium chloride, calcium citrate, lead acetate, basic lead acetate, aluminum sulfate, borax, and compounds which in solution yield borate ions. Some of these polyvalent cross-linking agents are sensitive to the pH of the solution, however, and if the pH is too high or too low may result in the formation of a precipitate instead of a gel. For this reason, lead acetate, basic lead acetate and the borate cross-linking agents, which are less sensitive to pH, are preferred. Suitable borate cross-linking agents include boric acid, calcium metaborate, potassium metaborate, potassium tetraborate, sodium metaborate, sodium metaborate tetrahydrate, sodium tetraborate, sodium tetraborate tetrahydrate, and sodium tetraborate decahydrate. The latter compound, marketed commercially as borax, is preferred because of its ready availability, its low cost, and its effectiveness in very low concentrations.

The concentration of the cross-linking agent employed should normally range between about 0.01 and about 12.0 pounds per barrel of colloidal solution, again depending upon the particular polysaccharide used. The most effective concentration also varies somewhat with different cross-linking agents. Cross-linking agent concentrations between about 0.05 and about 0.4 pound per barrel have been found to be generally effective for guar gum; while concentrations at the upper end of the range are more suitable for sodium alginate and certain other of the polysaccharides. The optimum concentration for any particular polysaccharide can readily be determined by simple laboratory gelling tests. The cross-linking agents may be predissolved in a small amount of water before they are added to the solution or may instead be added as a slurry in water or oil. The temperature may be increased to reduce the water required if a solution is used. The use of about 0.1 to 0.2 pound of a 10 molar borax solution as a cross-linking agent per barrel of guar gum solution has been found to give excellent results.

The gel is formed by mixing the cross linking agent into the polysaccharide solution. Gel formation occurs rapidly. In a preferred procedure, the cross-linking agent solution can be injected into the polysaccharide solution as it is pumped from the preparation tank. Another procedure is to add boric acid to the solution and gel it by raising the pH with caustic or a basic buffer. Regardless of the particular method employed, the colloidal solution and cross-linking agent should be mixed to form the gel before the materials are injected into the wellbore.

The gels formed by addition of the cross-linking agent to the polysaccharide solution are pumped into the borehole in order to plug fissures in the strata surrounding the borehole. Experience has shown that passage of the gels through the drilling rig pump does not adversely affect them. Sufficient pump pressure to force the gel into the fissures should be used. The gel can be mixed in batches of from 10 to 20 barrels in a small tank or cementing truck and pumped directly through the drill pipe to the lost circulation zone. Instead, the solution may be preformed and stored until needed. The cross-linking agent can then be added to the rig pump suction as the colloidal solution is pumped to the borehole. In other cases, the gel itself may be preformed and stored until the need for it arises. The tank used for gel storage should be connected through a short, large diameter suction to the rig pump. As pointed out earlier, a preservative may be employed if either of the latter procedures is used.

In employing polysaccharide gels for overcoming lost circulation problems, a bulking agent may be incorporated into the polysaccharide solution before the gel is formed or may be added to the gel after it has been formed. The use of such a bulking agent reduces the amount of gel required and permits the plugging of large fissures which might otherwise be difficult to plug. A variety of fibrous, flaky or granular materials may be employed as the bulking agent. Shredded cellophane has been found particularly effective as a bulking agent because of the low weight required and the resultant ease of transporting the material to remote well sites. From about 0.5 to 4.0 pounds of cellophane per barrel of colloidal solution is usually effective. Other bulking agents may be used in somewhat larger quantities. Where a permanent seal of the fissures or openings surrounding the wellbore is desired, it is frequently preferable to follow the gel with ordinary cement. Conventional oil well cementing equipment and techniques may be employed. Where only a temporary seal is required, to kill a well in order to trip tubing during a workover operation for example, the use of preservatives and cement plugs may be unnecessary. The gel formation is a reversable process and in time the gel will be converted back into a relatively low viscosity solution. This breaking of the gel can be accelerated if desired by injecting a small amount of acid into the borehole in order to lower the pH below about 7. Low molecular weight polyhydric alcohols such as ethylene glycol or glycerol can also be injected in order to liquify the gel.

The gel-forming properties of polysaccharides which include adjacent cis hydroxyl groups can be seen by considering the results obtained in a series of laboratory tests carried out with salts of alginic acid and with guar gum. As pointed out earlier, alginic acid is a linear polysaccharide made up of 1,4'-D-mannuronic acid units. It is generally considered to have the following structural formula:

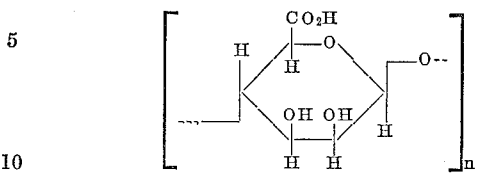

Guar gum is a galactomannan composed of D-galactose and D-mannose units and may be represented by the following formula:

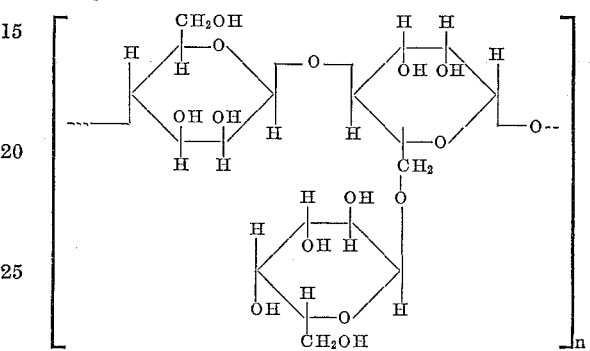

It will be noted that these two polysaccharides have quite different structures but that both are characterized by the presence of monosaccharide units having adjacent cis-hydroxyl groups. It is this similarity which accounts for the fact that these and similar polysaccharides form gels suitable for purposes of the invention.

In a first series of laboratory tests, gels were formed from a commercial sodium alginate marketed as "Keltex" by the Kelco Company of Chicago, Illinois. Samples of this polysaccharide were dissolved in separate portions of water at room temperature in concentrations of 2 weight percent and 3 weight percent. To each of the resulting viscous solutions was added 3 weight percent of a 10 molar borax solution. A gel rapidly formed in each sample. Examination showed the gels to be firm and persistent.

Following the preparation of gels with the commercial grade of sodium alginate as described above, additional gels were prepared with "Kelgin," a more highly refined sodium alginate marketed by the Kelco Company. Borax was employed as the cross-linking agent and concentrations similar to those mentioned above were used. Again the gels were firm and persisted for long periods of time.

Additional tests were carried out with sodium alginate, using calcium citrate as the cross-linking agent, and with ammonium alginate and calcium citrate. Concentrations ranged up to 3% for the alginate and from 1½ to 3 weight percent for the cross-linking agent. An excellent gel was obtained in each instance.

Similar tests were then carried out with guar gum and borax, using guar concentrations of 0.285 weight percent and 0.57 weight percent and 10 molar borax solution concentrations of 0.0285 weight percent and 0.057 weight percent. Gels formed rapidly following addition of the cross-linking agent. Little or no difference between the gels formed from the alginates and those formed from the guar gum could be detected.

After gels had been prepared in the laboratory as described above, a galactomannan gel was used to overcome a lost circulation problem encountered in a wildcat oil well located in a remote area. This well had been drilled to a depth of 3,843 feet when circulation was lost completely. In an effort to restore circulation, 100 bags of cement were spotted through open end 4½ inch drill pipe at the 3,841-foot level. This cement was then displaced with 53 barrels of conventional drilling mud. The drill pipe was pulled out of the borehole and the cement was allowed to harden. The drill pipe and bit were then worked to the bottom of the hole. Circulation was not restored. The drill pipe was again pulled from the hole in order to remove the bit and then re-inserted. 95 barrels of the galactomannan gel were prepared in 10 batches by mixing guar gum with water in ten-barrel mixing tanks. A guar gum concentration ranging from 2 to 3 pounds per barrel of water was used. Shredded cellophane in concentrations up to 0.8 pound per barrel was added. Nine of the batches were gelled with 0.2 pound of borax per barrel; while the tenth batch contained 0.3 pound of borax per barrel. The 95 barrels of gel were pumped through 3,840 feet of 4½ inch drill pipe at a pressure of 1,200 pounds per square inch and forced into the lost circulation zone. Ten barrels of water and 30 barrels of mud were used to displace the gel from the drill pipe into the formation. After several stands of pipe had been removed, the hole was filled through the fill-up line and mud was circulated. Returns were obtained. The placement of a cement plug behind the gel resulted in permanent seal of the lost circulation zone.

It can be seen from the foregoing that the use of galactomannan gel permitted the restoration of circulation after 100 bags of cement had failed to do so. Only 200 pounds of galactomannan were required to form 95 barrels of gel. This quantity of galactomannan can be quickly flown to remote sites; whereas the transportation of conventional cement and bulking agents might take much longer and be much more expensive. No difficulties in preparing or applying the gel were encountered.

Results similar to those described above were obtained when a galactomannan gel was employed to kill a well which could not be killed with mud. 190 barrels of mud had been pumped into the well without results. An aqueous colloidal solution of galactomannan had been previously prepared by adding guaran to water in a concentration of one pound per barrel and permitting it to hydrate. Sixteen thousand pounds of salt, sodium chloride, was added to 200 barrels of this solution in a 210 barrel mixing tank. The resulting brine solution containing colloidal galactomannan had a density of 9.5 pounds per gallon. The galactomannan solution and an aqueous solution containing 80 pounds of borax were mixed to form a gel by pumping them through a common line. The gel was then pumped into the casing annulus. The well filled up and remained full. After pulling the tubing from the well, 18 barrels of salt water was added to fill the hole. Calculations showed that the tubing displacement was approximately 18 barrels. Tubing and a packer were pulled and rerun into place and the hole was swabbed. Tests indicated that the well had been killed. The producing zone was a fractured, vugular one in which many lost return problems had been encountered when the well was originally drilled. The galactomannan gel permitted killing of the well even though mud containing bulking agents had been lost to the formation when drilling it. After the workover operation had been completed, production was readily restored by flowing the well.

In still another case, 100 barrels of gelled galactomannan solution was prepared and stored for use in controlling lost circulation during a well drilling operation. The gel was employed at two different depths in a well where complete loss of circulation occurred and permitted the restoration of circulation without difficulty.

The foregoing examples clearly show that the use of polysaccharide gels permits the plugging of fissures in subsurface strata surrounding boreholes where conventional methods for plugging such fissures are often unsuccessful. The economy made possible through the use of large volumes of gel having a low solids concentration, the fact that the gel can readily be mixed and pumped into the borehole without difficulty, the advantage in that the gel does not result in sticking of the drill pipe, and the fact that it does not have to be drilled out after it has been placed all make the use of polysaccharide gels for plugging porous subsurface strata highly attractive.

What is claimed is:

1. A process for overcoming lost circulation during the drilling of a borehole which comprises preparing an aqueous solution of galactomannan at the earth's surface, adding a cross-linking agent to said solution in a concentration sufficient to form a viscous gel capable of plugging vugs and fissures, and injecting the resultant preformed gel into said borehole under sufficient pressure to plug vugs and fissures in the surrounding strata without fracturing said strata.

2. A process as defined by claim 1 wherein said galactomannan is guar gum.

3. A process as defined by claim 1 wherein said cross-linking agent is a borate.

4. In the drilling of a borehole in the earth wherein a drilling fluid is normally injected into the borehole, circulated benath thed rill bit, and returned to the earth's surface for the removal of cuttings produced by said bit and wherein at least part of said fluid escapes from said borehole into an adjacent lost circulation zone, the improvement which comprises discontinuing the injection of said drilling fluid; injecting into said borehole a viscous preformed gel produced at the earth's surface by adding a polyvalent cross-linking agent to an aqueous solution of a glycan having monosaccharide units containing adjacent cis hydroxyl groups, said cross-linking agent being added in a concentration sufficient to form a gel capable of plugging vugs and fissures in said lost circulation zone; displacing said gel into said lost circulation zone while maintaining the borehole pressure below the normal fracturing pressure of the surrounding subsurface strata; and thereafter resuming the injection of said drilling fluid into said borehole.

5. A process as defined by claim 4 wherein said glycan is an alginate.

6. A process as defined by claim 4 wherein said glycan is guar gum.

7. In the drilling of a borehole in the earth wherein the drilling fluid is normally injected into the borehole, circulated beneath the drill bit, and returned to the earth's surface for the removal of cuttings produced by said bit and wherein at least part of said drilling fluid escapes from said borehole into an adjacent lost circulation zone, the improvement which comprises discontinuing the injection of said drilling fluid into said borehole; injecting a viscous preformed gel containing a suspended bulking agent into said borehole, said gel having been prepared at the earth's surface by the addition of from about 0.05 to about 0.4 pound per barrel of a compound yielding borate ions in aqueous solution to an aqueous colloidal solution containing guar gum in a concentration of from about 1.0 to about 2.0 pounds per barrel of water; displacing said gel containing said suspended bulking agent into said lost circulation zone while maintaining the borehole pressure below the fracturing pressure of the surrounding subsurface strata; and thereafter resuming the injection of said drilling fluid into said borehole.

8. A process as defined by claim 7 wherein said compound yielding borate ions is borax.

9. A process as defined by claim 7 wherein cement is pumped into said lost circulation zones behind said gel and allowed to set before the injection of said drilling fluid into said borehole is resumed.

10. A process for plugging lost circulation zones surrounding a borehole in the earth which comprises preparing an aqueous colloidal solution containing a polysaccharide including mannose monosaccharide units in a concentration of from about 0.5 to about 12.0 lbs. per barrel of water, adding from about 0.1 to about 12.0 lbs. of a borate cross-linking agent to each barrel of such solution to produce a gel capable of plugging vugs and fissures in the formation surrounding said borehole, pumping said gel into lost circulation zones surrounding said borehole, and injecting cement into said lost circulation zones following the injection of said gel.

References Cited by the Examiner
UNITED STATES PATENTS

| | | | |
|---|---|---|---|
| 1,635,500 | 7/27 | Potts | 166—29 X |
| 2,174,027 | 9/39 | Ball | 166—31 |
| 2,224,120 | 12/40 | Hart | 166—31 |
| 2,332,822 | 10/43 | Williams | 166—30 |
| 2,439,833 | 4/48 | Wagner | 166—32 |
| 2,800,184 | 7/57 | Meadors | 166—21 X |
| 2,854,407 | 9/58 | Mallory | 252—8.5 |
| 3,058,909 | 10/62 | Kern | 166—42 X |

OTHER REFERENCES

Sawdon, W. A.: "Lost Circulation in Rotary Holes," in the Petroleum Engineer, pp. 27–30, February 1936.

Rogers, W. F.: Composition and Properties of Oil Well Drilling Fluids, Houston, Gulf Publication Co., 1948, pp. 452, 453.

Whistler et al.: Polysaccharide Chemistry, published 1953, by Academic Press Inc., New York, page 45.

CHARLES E. O'CONNELL, *Primary Examiner.*

BENJAMIN BENDETT, *Examiner.*